(12) United States Patent
Regier

(10) Patent No.: US 9,179,603 B2
(45) Date of Patent: Nov. 10, 2015

(54) COMBINE CLEANING SYSTEM WITHOUT A SHAKING SIEVE

(71) Applicant: AGCO Corporation, Duluth, GA (US)

(72) Inventor: Bernard D. Regier, Newton, KS (US)

(73) Assignee: AGCO Corporation, Duluth, GA (US)

( * ) Notice: Subject to any disclaimer, the term of this patent is extended or adjusted under 35 U.S.C. 154(b) by 56 days.

(21) Appl. No.: 14/132,017

(22) Filed: Dec. 18, 2013

(65) Prior Publication Data

US 2014/0179382 A1 Jun. 26, 2014

Related U.S. Application Data

(60) Provisional application No. 61/740,050, filed on Dec. 20, 2012.

(51) Int. Cl.
*A01F 12/32* (2006.01)
*B07B 1/00* (2006.01)
*A01F 12/44* (2006.01)

(52) U.S. Cl.
CPC .................................. *A01F 12/442* (2013.01)

(58) Field of Classification Search
CPC ......... A01F 12/442; A01F 12/52; A01F 7/06; A01F 7/065; A01F 12/00; A01F 12/26; A01D 41/12; A01D 41/127; A01D 41/1276
USPC ............................................ 460/16, 68, 101
See application file for complete search history.

(56) References Cited

U.S. PATENT DOCUMENTS

| | | | | |
|---|---|---|---|---|
| 2,053,148 A * | 9/1936 | James | ............................. | 460/67 |
| 2,927,694 A * | 3/1960 | Scranton et al. | .............. | 209/283 |
| 3,589,111 A * | 6/1971 | Gullickson et al. | ............ | 56/12.8 |
| 3,662,763 A * | 5/1972 | Denison et al. | .................. | 460/75 |
| 3,946,746 A * | 3/1976 | Decoene et al. | ................. | 460/73 |
| 3,982,548 A * | 9/1976 | Stamp et al. | .................... | 460/68 |
| 3,982,549 A * | 9/1976 | De Pauw et al. | ................. | 460/67 |
| 4,148,323 A * | 4/1979 | McMillen et al. | .............. | 460/70 |
| 4,149,543 A * | 4/1979 | Decoene et al. | ................ | 460/83 |
| 4,180,081 A * | 12/1979 | Shaver | ............................ | 460/16 |
| 4,284,086 A * | 8/1981 | Williams | ........................ | 460/65 |
| 4,367,757 A * | 1/1983 | Claas | .............................. | 460/69 |
| 4,457,316 A * | 7/1984 | James | ............................. | 460/74 |
| 4,458,697 A * | 7/1984 | James | ............................. | 460/74 |
| 4,498,483 A * | 2/1985 | Dammann | ....................... | 460/69 |
| 4,663,921 A * | 5/1987 | Hagstrom et al. | ............. | 56/14.6 |
| 4,718,434 A * | 1/1988 | Raineri | ........................... | 460/75 |
| 4,869,272 A * | 9/1989 | Ricketts et al. | ............... | 460/100 |
| 5,041,059 A * | 8/1991 | Ricketts et al. | ............... | 460/101 |
| 5,489,239 A * | 2/1996 | Matousek et al. | .............. | 460/62 |
| 5,769,712 A * | 6/1998 | Honas | ............................. | 460/74 |
| 6,358,142 B1 * | 3/2002 | Imel et al. | ..................... | 460/109 |
| 7,226,355 B2 * | 6/2007 | Schenk | ......................... | 460/109 |
| 2004/0162123 A1 * | 8/2004 | Visagie et al. | .................. | 460/79 |

* cited by examiner

*Primary Examiner* — Árpád Fábián-Kovács

(57) ABSTRACT

A method comprising rotating a rotor to expel, radially, a mixture of grain and material other than grain (MOG) from the rotor and past a rotor cage encircling the rotor; causing an air flow in a substantially arcuate channel defined by the rotor cage, a first cover assembly covering a substantial portion of the rotor cage, and a passive sieve, to entrain a first portion of the MOG; capturing a first portion of the grain with the first cover assembly and plural vanes located along the length and on the interior surface of the first cover assembly, the captured grain sliding by gravity along the vanes to the passive sieve, the captured grain comprising threshed and unthreshed portions; enabling the passage of the captured grain through the passive sieve and into a second channel within which a grain conveying assembly is disposed; conveying with the grain conveying assembly the passed, unthreshed portion rearwardly; and conveying with the grain conveying assembly the passed, threshed portion forwardly.

6 Claims, 5 Drawing Sheets

COMBINE CLEANING SYSTEM WITHOUT A SHAKING SIEVE

CROSS REFERENCE TO RELATED APPLICATION

This application claims priority to copending U.S. provisional application entitled, "Combine Cleaning System Without A Shaking Sieve," having Ser. No. 61/740,050, filed Dec. 20, 2012, which is entirely incorporated herein by reference.

TECHNICAL FIELD

The present disclosure is generally related to agricultural systems and, more particularly, combine harvester cleaning systems.

BACKGROUND

A combine harvester is provided with many systems that provide a multitude of functionality, including threshing, separating, and cleaning. Within conventional cleaning systems, oscillating sieve assemblies in conjunction with air flow remove chaff and other residue from the threshed grain, which gravitates through the bottom sieve assembly to an oscillating clean grain pan. The clean grain pan, in turn, directs the clean grain to a discharge auger that elevates the grain to an onboard storage bin. A second oscillating pan directs materials other than grain and unthreshed grain over the edge of the bottom sieve assembly to a different discharge outlet for recirculation back through the threshing, separating and cleaning apparatus to extract the previously unthreshed grain.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Figure 1:
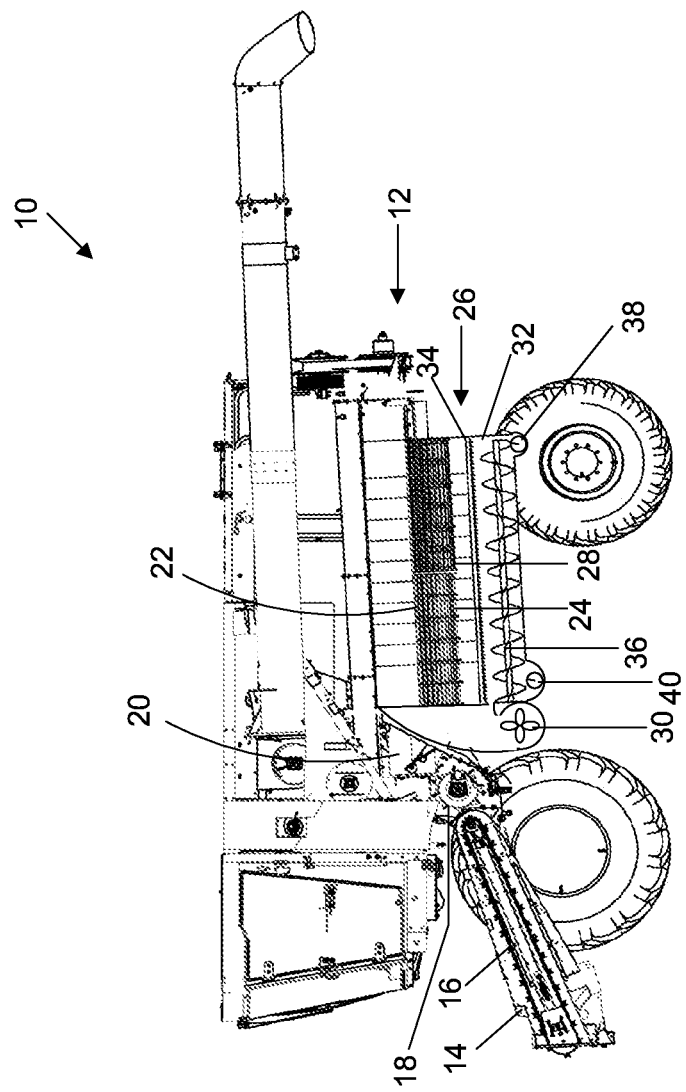
FIG. 1 is a schematic diagram that illustrates an example environment in which an example embodiment of a combine processing system may be implemented.

In one embodiment, a method comprising rotating a rotor to expel, radially, a mixture of grain and material other than grain (MOG) from the rotor and past a rotor cage encircling the rotor; causing an air flow in a substantially arcuate channel defined by the rotor cage, a first cover assembly covering a substantial portion of the rotor cage, and a passive sieve, to entrain a first portion of the MOG; capturing a first portion of the grain with the first cover assembly and plural vanes located along the length and on the interior surface of the first cover assembly, the captured grain sliding by gravity along the vanes to the passive sieve, the captured grain comprising threshed and unthreshed portions; enabling the passage of the captured grain through the passive sieve and into a second channel within which a grain conveying assembly is disposed; conveying with the grain conveying assembly the passed, unthreshed portion rearwardly; and conveying with the grain conveying assembly the passed, threshed portion forwardly.

Detailed Description

Certain embodiments of a combine processing system and method are disclosed that provide a cleaning system that eliminates many of the cleaning mechanisms used in conventional systems. For instance, certain embodiments of combine processing systems clean the grain processed in a combine harvester (hereinafter, combine) without the use of a shaking sieve. In one embodiment, the combine processing system is embodied as a combine core, the combine core comprising a threshing and separating system and a cleaning system. In some embodiments, the combine processing system may comprise less than all components or subsystems of the combine core. In one embodiment, the combine processing system comprises a rotor and a rotor cage that encircles the rotor, the rotor cooperating with the rotor cage to thresh the grain and separate the grain from material other than grain (MOG), and cause a mixture of the grain (e.g., threshed and unthreshed portions) and the MOG to be expelled in known manner via centrifugal action from the rotor, wherein the mixture moves at a high velocity radially from the rotor and through openings in the rotor cage.

The combine processing system further comprises the cleaning system that, in one embodiment, comprises a fan or blower (hereinafter individually and collectively referred to as an air blowing apparatus), a passive sieve, one or more cover assemblies, and an auger assembly. The air blowing apparatus introduces a controlled (e.g., adjustable) air stream or air flow from the front end of the cleaning system above (and below) the passive sieve at a velocity capable of entraining the MOG above the passive sieve but generally not fast enough to entrain the grain (or at least minimal grain entrainment). In other words, in some embodiments, the amount of grain that continues to fall to the rest of the cleaning system is 100% (or approximately 100%) of the expelled grain. The MOG (e.g., most of the MOG) is carried by the air flow out of the rear of the cleaning system, and the grain is caught or captured by the cover assemblies. The air provided by the air blowing apparatus and that is flowing above the passive sieve entrains the MOG that is mixed with the grain expelled from the rotor cage, assisted by air (also generated by the air blowing apparatus) that flows upward and through the passive sieve, to prevent or significantly hinder the passage of the MOG through the passive sieve.

The rearward movement of the grain is discouraged by a plurality of vanes (e.g., blades) located along an interior surface of the cover assemblies, which causes the grain to slide (e.g., via gravity) down the interior sides of the cover assemblies and onto the passive sieve. The phrase "passive sieve" refers to the fact that the sieve is not directly-mechanically agitated or oscillated, but rather, rests passively in the cleaning system, with any movement naturally due to combine-travel as a whole. In one embodiment, the passive sieve comprises fork-like protrusions, angled in the direction of air flow, with slots to enable the passage of grain and any remaining (e.g., light) MOG. The grain, and possibly any remaining MOG, fall through the passive sieve, where the MOG (and possibly some unthreshed grain) is carried (e.g., rearwardly) by the air flow to a tailing return system for recirculation back to the front of the rotor, and the passed (e.g., passed through the passive sieve) grain substantially falls to the auger assembly. The threshed grain that passes through the sieve largely falls in a first portion of the auger assembly for conveyance forwardly, and the unthreshed grain generally passes through the passive sieve more rearwardly and onto another portion of the auger assembly for conveyance rearwardly. The auger assembly may be embodied as a plurality of stub augers, a single auger, or in some embodiments, other mechanisms for conveyance such as moving elastomeric (or other material) bands, grates or slats (e.g., wooden), etc. The auger assembly and other mechanisms of conveyance may also be referred to herein as a grain conveying assembly. For instance, in one embodiment, the auger assembly has a split approximately two-thirds (⅔) (e.g., ⅔ is one example, and other ratios of splits may be used) of the way rearward of the assembly, where the front auger has flighting according to a first direction that conveys material forward and the rear auger comprises flighting according to the opposite direction that conveys material rearward. The material conveyed forward is clean and the material conveyed rearward is routed to the tailings return. In other words, the clean grain is conveyed in one embodiment toward the air blowing apparatus side of the cleaning system and ultimately discharged to a grain elevator assembly that carries the cleaned grain to a hopper or other storage container, as is well-known.

Certain embodiments of combine processing systems, through the implementation of the cleaning system embodiments as disclosed, may eliminate or reduce the use of mechanical mechanisms conventionally used to shake (e.g., oscillate) the sieves, and may also eliminate or reduce the weight and accompanying seals that are often present with such conventional systems; enabling a lower capital cost and a lower maintenance costs, combined with an effective and efficient mechanism for cleaning grain.

Having summarized certain features of one or more combine processing systems of the present disclosure, reference will now be made in detail to the description of the disclosure as illustrated in the drawings. While the disclosure will be described in connection with these drawings, there is no intent to limit it to the embodiment or embodiments disclosed herein. For instance, though axial-based rotor designs are described herein for illustrative purposes, it should be appreciated within the context of the present disclosure that certain embodiments of combine processing systems may be used in transverse rotor, twin-rotor, hybrid, conventional, and/or other combine core designs. Further, although the description identifies or describes specifics of one or more embodiments, such specifics are not necessarily part of every embodiment, nor are all of any various stated advantages necessarily associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of the combine looking forwardly.

Reference is made to FIG. 1, which illustrates an example environment, that is, a combine 10, in which an example embodiment of a combine processing system 12 may be implemented. One having ordinary skill in the art should appreciate in the context of the present disclosure that the example combine 10 depicted in FIG. 1 is merely illustrative, and that other combine designs may be used in some embodiments. For instance, FIG. 1 schematically illustrates a so-called axial rotary combine 10 in which the threshing and separating mechanisms comprise a rotor disposed axially in the machine with respect to its fore-and-aft axis. However, many other types of threshing and separating mechanisms are currently in commercial use and hence certain embodiments of a combine processing system 12 are not intended to be limited to any one particular type of threshing and separating mechanism.

In addition to the combine processing system 12 described below, the combine 10 further comprises a feed housing 14 that receives harvested materials from a suitable header (not shown) and advances such materials upwardly and rearwardly via a conveyor 16 toward a beater 18 rotating in a counterclockwise direction (e.g., viewing FIG. 1). The beater 18 impels the harvested materials upwardly and rearwardly into a receiving housing 20. It should be appreciated that in some embodiments, the beater 18 may be omitted and the materials advanced directly between the feed housing 14 and the housing 20. The housing 20 contains at least a portion of the combine processing system 12, including a cylindrical rotor cage 22. The rotor cage 22 encircles a threshing and separating rotor (obscured from view in FIG. 1). The threshing and separating rotor is disposed within the front end of the rotor cage 22, the front end having a series of helical vanes that start the materials moving rearwardly in a spiral path of travel along the outside of the rotor. As the materials move rearwardly, a foraminous concave 24 (which may include a plurality of coupled, modular-structured concaves) of the rotor cage 22 cooperates with the rotor to thresh the materials, and initial separation occurs as grain and smaller residue are pushed through the grated concaves 24 by centrifugal force to a cleaning system 26. Large residue pieces such as stalks and stems continue to move rearwardly past a separating grate 28, which allows the grain to pass radially out of the rotor area to the cleaning system 26, but not the larger residue. Such residue eventually discharges out the rear end of the rotor cage 22 where it is acted upon by a discharge assembly (not shown), such as a chopper or spreader, and deposited on the ground.

Generally speaking, the threshed grain works its way downwardly through the machine as it is acted upon cleaning system 26. The cleaning system 26 comprises an air blowing apparatus 30 (e.g., fan or blower), one or more cover assemblies 32 (e.g., comprised of steel or other metals, and/or plastics in some embodiments), a passive sieve 34 (e.g., also comprised of steel or other metals, and/or plastics in some embodiments), and an auger assembly 36. It should be appreciated within the context of the present disclosure that, though referred to in the plural, the cover assemblies 32 may refer to distinct portions of a single panel (e.g., a single, malleable sheet of metal), or separate components that are directly connected together (e.g., tacked, welded, screwed, etc.) or connected together through an intermediate component. The cleaning system 26 comprises plural channels that enable the flow of air from the front to the back of the cleaning system 26. For instance, the air blowing apparatus 30 causes a flow of air that entrains light residue, such as light chaff particles (also referred to herein as material other than grain or MOG) that is expelled through the rotor cage 22 and enters one of the channels below the rotor cage 22. The entrained MOG is carried rearwardly through one of the channels of the cleaning system 26 in the air flow and ultimately discharged out the rear of the combine 10. The grain (and possibly some MOG not carried away in the aforementioned channel) is collected on the passive sieve 34, which has openings that enable passage of the grain (and whatever MOG is remaining) through the passive sieve 34 to another channel defined by a lower portion of the cover assemblies 32 and the passive sieve 34. The air under the passive sieve 34 also passes up through the passive sieve 34 at a speed great enough to entrain the MOG but slow enough to let the grain (e.g., both threshed and unthreshed portions) pass through. In some embodiments, two (e.g., upper and lower) passive sieves may be used, such as to trap the unthreshed grain between the upper and lower sieves and permit the threshed grain to fall through both passive sieves. The passed-through MOG is carried rearwardly by the air flowing in the lower channel (i.e., the channel associated with the lower portion of the cover assemblies 32), and as it is passed through, the unthreshed grain is conveyed rearwardly via the auger assembly 36, to be recirculated as tailings through assistance of a tailings auger 38. In other words, tailings, consisting of unthreshed grain along with MOG, are conveyed to the tailings auger 38, which then routes the tailings via mechanisms well-known (yet not illustrated) for recirculation back through the combine processing system 12 to further separate the grain from such residue. The auger assembly 36, disposed in the lower channel and hence surrounded by the combination of the passive sieve 34 and the lower portion of the cover assemblies 32, conveys the collected grain forwardly to the auger 40, which cooperates with an elevator (not shown) that, as is well-known, conveys the clean grain up to a storage tank at the top of the combine 10.

Figure 2A:
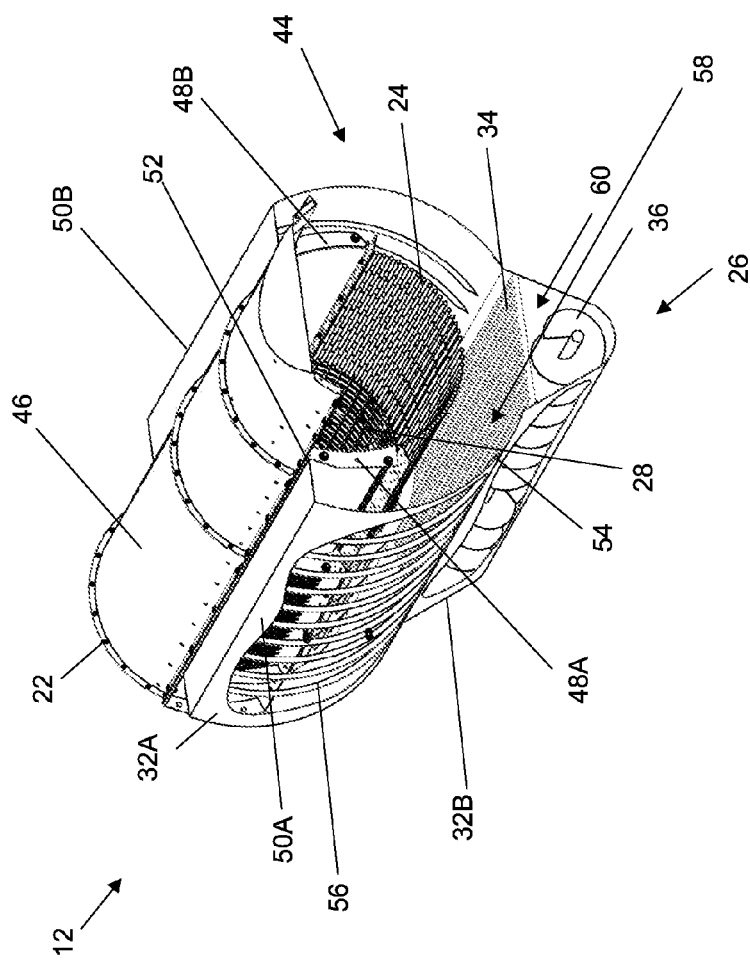
FIG. 2A is a schematic diagram that illustrates, in isometric, cut-away view, select features of an example embodiment of a combine processing system without a rotor shown.
Figure 2B:
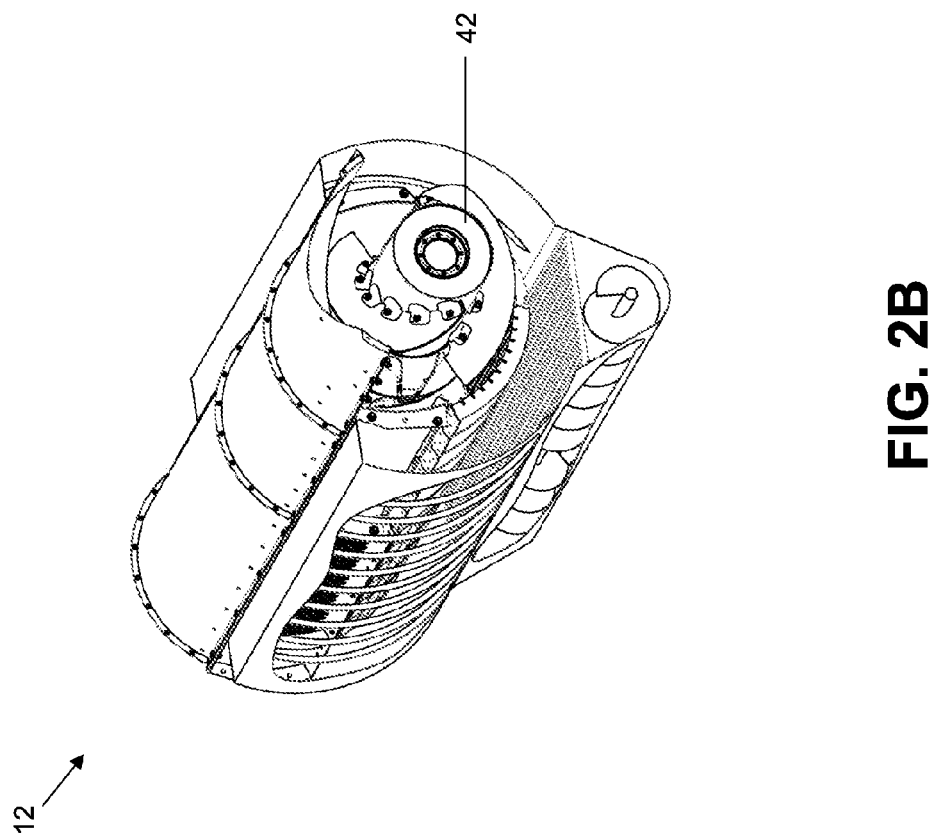
FIG. 2B is a schematic diagram that illustrates, in isometric, cut-away view, select features of an example embodiment of a combine processing system with a rotor shown.

Having described some features of an example embodiment of a combine processing system 12, attention is directed to FIG. 2A, which illustrates one embodiment, in isometric view, of the combine processing system 12 with a rotor omitted for facilitating an understanding of certain features. An embodiment of the combine processing system 12 with a rotor 42 is shown in FIG. 2B. Attention is directed to FIG. 2A for purposes of discussion below, with similar applicability to FIG. 2B. It should be appreciated that the combine processing system 12 depicted in FIG. 2A is illustrative, and that variations of the design are contemplated to be within the scope of the disclosure. The front 44 of the combine processing system 12 is depicted in FIG. 2A (and FIG. 2B) as closest to the reader. The combine processing system 12 comprises the rotor cage 22 (which encircles the rotor 42 as depicted in FIG. 2B), the cover assemblies 32 (e.g., 32A and 32B, shown in cut-away view), the passive sieve 34, and the auger assembly 36. The rotor cage 22 may be constructed with a plurality of arcuate sections, such as one or more top covers 46, opposing side rails 48 (e.g., 48A and 48B), the concaves 24, and the separating grates 28. As rotor cages 22 are well known to those having ordinary skill in the art, further description of the same is omitted here for brevity except where pertinent to the features of the combine processing system 12. The cover assemblies 32 comprise an upper or first cover assembly 32A and a lower or second cover assembly 32B connected to the first cover assembly 32A at an elevation proximal to the location of the passive sieve 34. Note that the passive sieve 34 is narrower than conventional sieves, allowing for an efficient collection of grain.

In one embodiment, the upper or first cover assembly 32A comprises a two-piece or paired arrangement that is mirrored on opposite sides of the rotor cage 22 and detachably (e.g., removably) affixed to the respective side rails 48A and 48B of the rotor cage 22. In particular, the first cover assembly 32A comprises a pair of opposing, arcuate panels 50 (e.g., 50A, 50B) that are separated from the adjacent arcuate outer surface of the rotor cage 22 by a gap (except at the point of connection with the respective side rails 48A and 48B). That is, each panel 50A and 50B is connected to the rotor cage 22 at one respective radial location of the rotor cage 22 (e.g., at the respective side rails 48) along the length of the rotor cage 22, the other connection at the junction of the passive sieve 34 and the lower or second cover assembly 32B. For instance, for the panel 50A, the connection of the panel 50A to the side rail 48A resides in the top hemisphere of the rotor cage 22 at, using a clock analogy, approximately the 10:00 o'clock location denoted by reference numeral 52 (and symmetrically, approximately at the 2:00 o'clock position of the side rail 48B of the rotor cage 22 for connection to the other panel 50B). The panel 50A is connected to the passive sieve 34 and the second cover assembly 32B at radial position 54 (with likewise, the opposing, symmetrical connection to the panel 50B with the other end of the passive sieve 34 and second cover assembly 32B). Note that these radial locations for connection are merely illustrative, and that in some embodiments, other locations for connections (and/or additional locations) are contemplated to be within the scope of the disclosure. Note that one or more components of the combine processing system 12 may be disassembled and replaced and/or cleaned.

In some embodiments, the connection at radial position 54 (and the mirrored connection for panel 50B with the cover assembly 32B) may involve all three components (i.e., the first and second cover assemblies 32A and 32B and the passive sieve 34) in a fixed configuration (e.g., welded together or otherwise affixed to one another), or in some embodiments, the connection at radial position 54 (and mirrored side) may involve affixing (e.g., welding, tacking, screws, etc.) the first and second cover assemblies 32A and 32B together (e.g., directly or indirectly via an intermediate member), with the passive sieve 34 adjustably coupled to an internal surface of the first and second cover assemblies 32 or coupled to an intermediate member that is coupled to the aforementioned interior surfaces. For instance, the adjustable coupling may involve an interior slot, ridge, rail or other attachment member disposed in or on an interior surface of the panels 50A and 50B proximal to the radial connection at 54 (and mirrored side) that enables the passive sieve 34 to rest on (or be snapped into or otherwise adjustably positioned onto) the attachment member. In some embodiments, the first and second cover assemblies 32A and 32B may be an integrated assembly that is malleable, enabling the integrated cover assembly to be mechanically formed into upper and lower cover assemblies of different channels volumes.

The interior surface of the first cover assembly 32A comprises plural vanes 56 located along the length of the first cover assembly 32A (e.g., on the interior surface of each panel 50A (as exposed in cut-away of the panel 50A, 50B (for 50B shown in part on interior surface of panel 50B))). The plural vanes 56 hinder the rearward movement of grain (e.g., as influenced by the air flow in the upper channel), and hence the first cover assembly 32A and associated plural vanes 56 serve to capture the grain and enable the grain to slide via gravitational force to the passive sieve 34. In one embodiment, and viewed from the perspective of one of the panels 50A (with similar applicability to the other panel 50B), the vanes 56 run from the uppermost part of the panel 50A to the radial position 54 corresponding to the location of the passive sieve 34. In some embodiments, the length of the vanes 56 may be shorter, or in some embodiments, longer that those depicted in FIG. 2A (e.g., extending onto the passive sieve 34). Although the vane configuration for both panels 50A, 50B is shown in opposing, symmetrical fashion, in some embodiments, the pattern may be asymmetrical relative to the other panel. Further, though shown as equally spaced along each respective panels 50, the vanes 56 may be unequally spaced in some embodiments and/or in different quantities.

Directing attention to the passive sieve 34, the passive sieve 34 may be adjustable in some embodiments, as indicated above. For instance, in embodiments where the passive sieve 34 rests on or, snaps into (or otherwise is adjustably coupled to) an attachment member along the length of the interior surface of the panels 50A, 50B of the first cover assembly 32A, there may be a plurality of such attachment members at different elevations and/or angles of the first cover assembly 32A. The passive sieve 34 comprises in one embodiment fork-like protrusions that are angled in the direction of air flow (away from the front 44), and which further comprises openings to enable grain to pass through to the lower channel corresponding to the second cover assembly 32B. In some embodiments, different configurations of passive sieve surfaces may be swapped out. As described above, some embodiments may comprise a fixably connected passive sieve 34 (e.g., fixably connected directly or indirectly with the first and second cover assemblies 32A and 32B), disallowing the ready-swapping out or adjustment of the passive sieve 34.

The interior surface of the first cover assembly 32A, the exterior surface of the rotor cage 22, and the passive sieve 34 define a substantially arcuate channel 58 (the aforementioned upper channel, which in one embodiment, is somewhat U-shaped when viewed fore and aft) that enables the flow of air (produced by the air blowing apparatus 30, FIG. 1) to pass through, which entrains the lighter chaffe or MOG. All or a portion of the entrained MOG may flow to the rear of the combine 10 (FIG. 1) and be discharged to the ground (or elsewhere), and any MOG that passes through the passive sieve 34 may be carried via the tailings return or passed along with the flow of air.

Located beneath the passive sieve 34, as explained above, is the second cover assembly 32B. The second cover assembly 32B may be comprised of a single, malleable, solid piece of metal that is affixed on both ends to the first cover assembly 32A, or in some embodiments, affixed to an intervening or intermediate member that both the first and second cover assemblies 32A and 32B are affixed to (e.g., welded, tacked, screwed, etc.). In some embodiments, the second cover assembly 32B may be a two-piece assembly, welded or coupled at the bottom of the second cover assembly 32B. In some embodiments, as mentioned above, the first and second cover assemblies 32A and 32B may be a single-piece, integrated, malleable assembly. Located between the passive sieve 34 and second cover assembly 32B is the auger assembly 36. In one embodiment, the auger assembly 36 may be comprised of a single auger (e.g., with different flighting directions), or in some embodiments, a plurality of opposed-direction augers (e.g., stub augers). The auger assembly 36 is driven according to well-known driving mechanisms of the combine 10 (FIG. 1), and hence description of the same is omitted here for brevity. The auger assembly 36 serves to convey the cleaned grain to the auger 40 (FIG. 1) and the unthreshed grain rearwardly (e.g., tailings return, via the auger 38 (FIG. 1)). The auger 40 cooperates with a well-known grain elevator to convey the grain to the storage tank. In some embodiments, the auger assembly 36 may be replaced with another mechanism (e.g., grain conveying assembly) for conveying the grain, such as an endless surface (e.g., bands, slats, etc.). The air flow in a second (lower) channel 60 locate beneath the passive sieve 34 is generally upward and through the passive sieve 34 to assist in entraining MOG and hence preventing or significantly limiting the amount of MOG that falls through the passive sieve 34. The tailings (e.g., an insignificant amount of MOG and possibly some unthreshed grain) are carried along with the air flow and/or auger assembly 36 in the second channel 60, the second channel 60 defined by the passive sieve 34 and the interior surface of the second cover assembly 32B to the tailings auger 38, which recirculates the tailings to the rotor 42 (FIG. 2B) for another processing iteration through the combine processing system 12.

Note that in some embodiments, the air blowing apparatus 30, the cover assemblies 32, the passive sieve 34, and the auger assembly 36 may collectively be referred to as the cleaning system 26. In some embodiments, the cleaning system 26 may include additional or fewer features.

Figure 3:
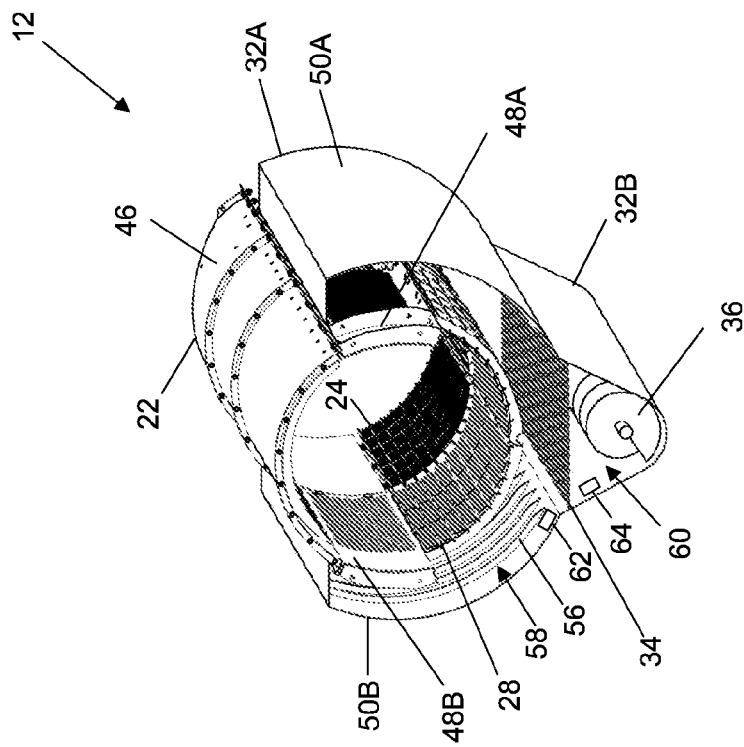
FIG. 3 is a schematic diagram that illustrates, in rear isometric view, select features of an example embodiment of a combine processing system.

FIG. 3 shows, in rear isometric view, select features of an example embodiment of the combine processing system 12 (with the rotor 42, FIG. 2B, omitted). Note that the fact that FIG. 3 is a rear elevation view means that some features that are uniquely left-hand side features (or uniquely right-hand side) in FIGS. 2A-2B are shown on the right-hand side (or left-hand side) in FIG. 3. The combine processing system 12 comprises the rotor cage 22, the first cover assembly 32A, the second cover assembly 32B, the passive sieve 34, and the auger assembly 36. The rotor cage 22 comprises the top covers 46, the side rails 48A and 48B with one radial end of the side rails 48 adjacent to the edge of the top covers 46, the other radial end adjacent the concaves 24 (forwardly and further away in FIG. 3) and the separating grates 28 (rearwardly, closer in FIG. 3). As shown, the first cover assembly 32A comprises opposing panels 50A, 50B. The panel 50B is connected along the length of the rotor cage 22 within the top hemisphere (affixed to the side rail 48B) of the rotor cage 22 at approximately the 10:00 o'clock position in FIG. 3. The panel 50A is connected in symmetrical fashion (though not limited to a symmetrical configuration), and in the embodiment depicted in FIG. 3, is connected along the length of the rotor cage 22 in the top hemisphere (affixed to the side rail 48A) of the rotor cage 22 at approximately the 2:00 o'clock position in FIG. 3. The interior surface of the panel 50B shows the plural vanes 56 running up and down along the length of the panel 50B (the vanes on the interior surface of the panel 50A obscured from view). Each panel 50B, 50A is connected to the second cover assembly 32B proximal in elevation to the passive sieve 34, and in this particular example, at radial locations corresponding to the 7:00 o'clock and 5:00 o'clock radial positions (in FIG. 3), respectively, along the length of the first and second cover assembly 32A and 32B. It should be appreciated that other and/or additional radial connection positions may be used and hence are contemplated to be within the scope of the disclosure. As described above, the cover assemblies 32 may comprise an integrated assembly, or be separate assemblies (e.g., panel pairs 50A, 50B, each affixed to the second cover assembly 32B or an intermediate member to which the pairs 50A, 50B and the second cover assembly 32B are affixed). Further, as described above, the passive sieve 34 may comprise an adjustable member, or a fixed member (e.g., welded to or otherwise affixed directly or indirectly to the first and second cover assemblies 32A, 32B).

Also depicted in FIG. 3 is the auger assembly 36, which in one embodiment, runs the length of the passive sieve 34, and serves to convey the grain to the auger 40 (FIG. 1) (e.g., forwardly) and ultimately, the storage bin via a well-known elevation assembly, and the unthreshed grain rearwardly (e.g., to the tailings auger 38). The substantially arcuate channel 58 running between the rotor cage 22 and collectively, the panels 50A and 50B and the passive sieve 34, and the channel 60 (e.g., running between the passive sieve 34 and the second cover assembly 32B) enable the flow of air to entrain MOG, the flow provided by the air blowing apparatus 30 (FIG. 1).

Also shown in FIG. 3 are plural sensors 62 and 64. For instance, the sensor 62 is shown as disposed on the interior surface of the panel 50A, and the sensor 64 is shown disposed on the interior surface of the second cover assembly 32B. It should be appreciated that there may be fewer sensors in some embodiments, or additional sensors in some embodiments, of the same or different type. For instance, a single sensor may be used to sense air flow (e.g., velocity) in the channel 58, or a sensor may be disposed at the rear discharge location of the channel 60 to sense acoustic loss (e.g., the presence or absence of MOG and/or grain). The sensors 62 may be located on the interior surfaces of the panel 50A (or panel 50B), or in some embodiments, on the exterior surface (or on other surfaces of the combine 10 (FIG. 1), such as affixed to the outside surface of the rotor cage 22). Likewise, the sensors 64 may be located on the interior surfaces of the second cover assembly 32B, or in some embodiments, on the exterior surface (or on other surfaces). The sensors 62 and/or 64, in their respective locations, may be used to sense the velocity of the air, or in some embodiments (e.g., where disposed in the rear discharge of the channel 58 and/or channel 60), the sensor(s) 62 and/or 64 may be configured as acoustic sensors that are used to detect the presence of grain (e.g., threshed grain) flowing out of the channels 58 and/or 60. For instance, if too much grain is lost via too much air flow, the sensors 62 and/or 64 detect the presence of a given quantity of grain that meets or exceeds a threshold, and triggers the air blowing apparatus 30 (FIG. 1), either directly or via an intermediate controller, to adjust (e.g., reduce) the air flow speed. The detection may be based on an indicator of grain presence meeting or exceeding a given parameter threshold, such as loudness (e.g., threshold decibels for an acoustic sensor). When configured as air velocity sensors, the sensors 62 and/or 64 may also provide feedback to the air blowing apparatus 30 to adjust the flow. In some embodiments, these sensors may provide feedback to a controller and/or controlled device responsible for one or more machine operations.

In some embodiments, these and/or additional sensors may be used based on one or more operational parameters. For instance, when the combine 10 (FIG. 1) slows to a rest, sensors corresponding to the navigational movement of the combine 10 (and/or positional sensors, such as for detecting the change in elevation of the header (not shown)) may result in an adjustment of the air blowing apparatus 30.

Figure 4:
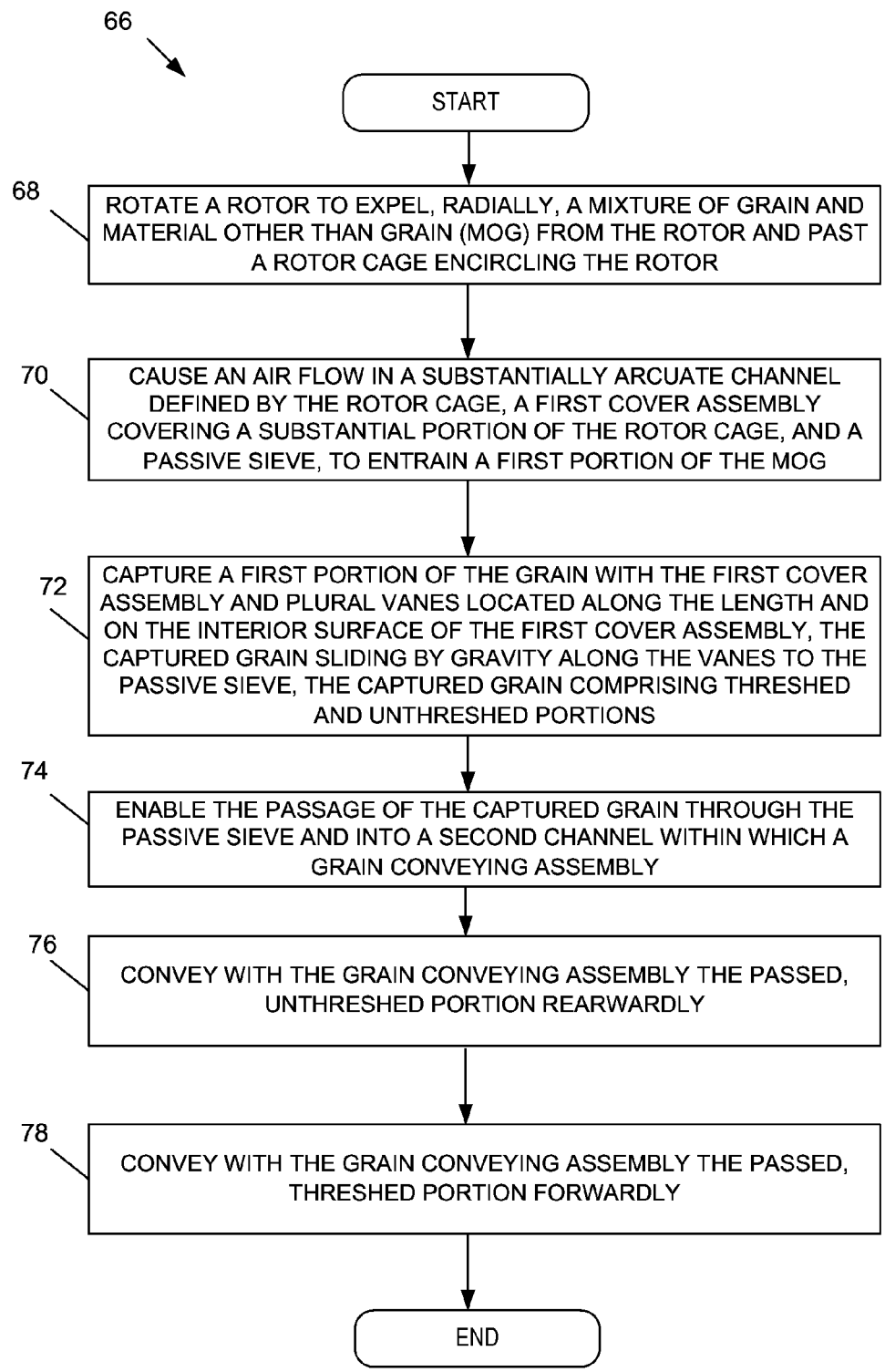
FIG. 4 is a flow diagram that illustrates an example embodiment of a combine processing method.

In view of the above description, it should be appreciated that one embodiment of a combine processing method, as depicted in FIG. 4 and denoted as method 66, comprises rotating a rotor to expel, radially, a mixture of grain and material other than grain (MOG) from the rotor and past a rotor cage encircling the rotor (68); causing an air flow in a substantially arcuate channel defined by the rotor cage, a first cover assembly covering a substantial portion of the rotor cage, and a passive sieve, to entrain a first portion of the MOG (70); capturing a first portion of the grain with the first cover assembly and plural vanes located along the length and on the interior surface of the first cover assembly, the captured grain sliding by gravity along the vanes to the passive sieve, the captured grain comprising threshed and unthreshed portions (72); enabling the passage of the captured grain through the passive sieve and into a second channel within which a grain conveying assembly (74); conveying with the grain conveying assembly the passed, unthreshed portion rearwardly (76); and conveying with the grain conveying assembly the passed, threshed portion forwardly (78).

Note that steps in the process, and alternate implementations are included within the scope of the embodiments in which functions may be performed out of order from that shown or discussed, including substantially concurrently or in reverse order, depending on the functionality involved, and/or additional or fewer steps performed, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

At least the following is claimed:

1. A combine processing system, comprising:
   a rotor;
   a rotor cage encircling the rotor, the rotor cage comprising opposing first and second side rails and plural concaves and separator grates, said concaves and separator grates comprising a plurality of openings to enable grain and material other than grain (MOG) to pass through the concaves and separator grates;
   a first cover assembly comprising first and second arcuate portions collectively surrounding a substantial portion of the rotor cage, the first arcuate portion affixed to the first side rail and the second arcuate portion affixed to the second side rail, the first cover assembly separated from the rotor cage by a gap except at points of connection with the respective side rails, the first and second arcuate portions each comprising a plurality of vanes, the plurality of vanes disposed on an interior surface along the length of each of the first and second arcuate portions and extending into said gap, each of the plurality of vanes extending proximally between a top location and a bottom location of the respective arcuate portion;
   a passive sieve connected to the interior surface along the length of the first and second arcuate portions and proximal to the bottom locations such that the passive sieve does not move substantially with respect to the rotor cage during operation of the system, wherein the rotor cage, the first cover assembly, and the passive sieve define a first substantially arcuate channel with the concaves and separator grates defining an upper boundary of the first channel and the passive sieve defining a lower boundary of the first channel, the passive sieve further comprising a plurality of openings to enable grain to pass through the passive sieve;
   a second cover assembly disposed beneath the passive sieve and along the length of the passive sieve, wherein the passive sieve and the second cover assembly define a second channel with the passive sieve defining an upper boundary of the second channel and the second cover assembly defining a lower boundary of the second channel;
   an auger assembly disposed between the second cover assembly and the passive sieve; and
   an air blowing apparatus located proximal to a first end of the rotor cage, wherein the air blowing apparatus directs a first stream of air into the first channel designed to entrain MOG, and wherein the air blowing apparatus directs a second stream of air into the second channel and up through the passive sieve to limit MOG from passing through the passive sieve.

2. The system of claim 1, wherein the first and second cover assemblies are connected to each other.

3. The system of claim 1, wherein the auger assembly comprises a single auger having two portions, one portion having flighting according to a first conveying direction and the other portion having flighting according to a second conveying direction.

4. The system of claim 1, further comprising one or more sensors configured to provide feedback to the air blowing apparatus.

5. The system of claim 4, wherein the one or more sensors are configured as a velocity sensor, acoustic sensor, or a combination of both when plural sensors are used.

6. The system of claim 1, wherein each of the first and second cover assemblies comprise a single malleable piece of metal of distinct geometries.

* * * * *